Oct. 15, 1946.   A. F. TURNER   2,409,407
REFLECTING ELEMENT FOR POLARIZED LIGHT
Filed Feb. 22, 1943   2 Sheets-Sheet 1

ARTHUR F. TURNER
INVENTOR.

BY
ATTORNEYS

Oct. 15, 1946.  A. F. TURNER  2,409,407
REFLECTING ELEMENT FOR POLARIZED LIGHT
Filed Feb. 22, 1943   2 Sheets-Sheet 2
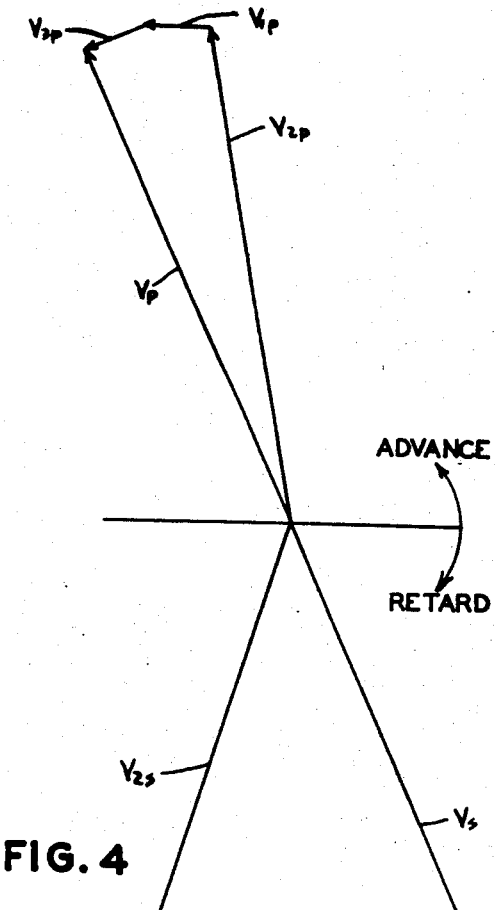
FIG. 4
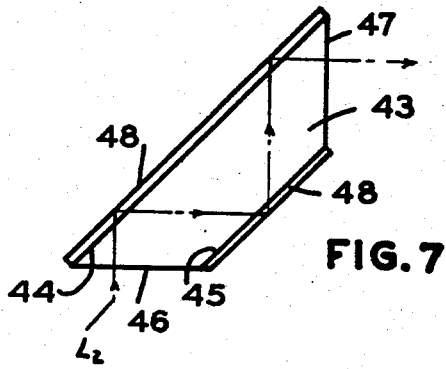
FIG. 7
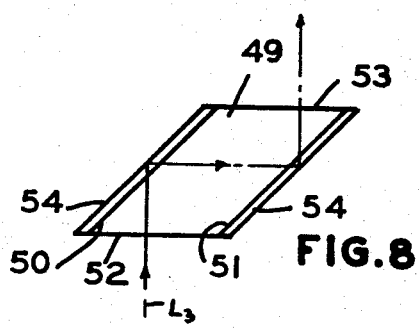
FIG. 8
FIG. 9
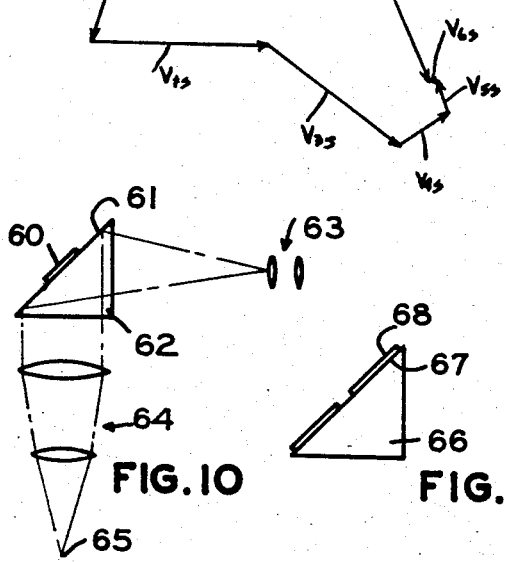
FIG. 10   FIG. 11
ARTHUR F. TURNER
*INVENTOR.*
BY
ATTORNEYS

UNITED STATES PATENT OFFICE 2,409,407

REFLECTING ELEMENT FOR POLARIZED LIGHT

Arthur F. Turner, Brighton, N. Y., assignor to Bausch & Lomb Optical Company, Rochester, N. Y., a corporation of New York Application February 22, 1943, Serial No. 476,675

4 Claims. (Cl. 88—65)

This invention relates to optical elements and more particularly to an element for reflecting polarized light.

The total internal reflection of plane polarized light introduces a phase shift between the electric vector vibrations in the plane of incidence and those in the plane perpendicular thereto. Such a phase shift which so alters polarized light is frequently undesirable in many optical systems, particularly systems employing analyzing means. Hence, only in special cases and with special precaution can a total reflecting surface be used in an optical system in which polarized light is used.

In its broadest aspect, my invention comprehends the modification and/or control of the ordinary phase shift created when polarized light of any description is reflected, and an important feature of the present invention is the ability through the use of the invention to free reflected polarized light from undesired defects which are present after reflectance.

A light ray passing from one transparent medium into a contacting medium of lower refractive index at any angle other than the normal is bent away from the normal to the boundary between the two media at its point of incidence with the boundary. In accordance with the phenomena of total reflection, if the angle between the incident ray and the normal is greater than the critical angle, the ray will not pass into the second medium but will be completely reflected internally within the first medium. This condition can be changed, however, if a third medium of any refractive index is interposed in contact between the first and second mentioned media. If the refractive index of the third medium is greater than $N_g \sin a_1$, where $N_g$ is the index of the first medium and $a_1$ is the angle of incidence, the effect of interposing the third medium between the two first mentioned media is to shift the occurrence of the total reflection from within the first mentioned medium to the boundary between the third and second mentioned media.

I have discovered that the phase shift due to reflection can be selectively modified or controlled to a marked degree by the presence of an interference film on the totally reflecting surface of an optical element which is formed of glass or other suitable transparent material and which is employed for reflecting polarized light. The film forms the third medium just mentioned and is of an isotropic, homogeneous, transparent and non-metallic substance. As is well known, films which cause interference of light are extremely thin and, as understood by the art when referring to an interference film, I mean a film having a geometrical thickness which is of the order of the magnitude of a wavelength of light.

The phase shift is dependent upon forming the optical element and the film from materials which have suitably different indices of refraction and for a given combination of materials is controlled by the thickness of the film as well as the wavelength of light and the angle of incidence of the same on the reflecting surface. There is no accompanying change of intensity of the light as a result of the phase shift, that is, the light is completely reflected. Incidentally, the presence of the film does not change the value of the critical angle as will be evidenced by the application of Snell's law.

The invention is particularly adapted for employment with prisms used in polarized light vertical illuminators as well as with prism telescopes and other instruments wherein a roof prism or a Porro system makes the ocular analyzer of the latter-named instruments partially inoperative for its intended purpose of reducing glare caused by atmospheric polarization or partial polarization created by external reflection.

It is well known that plane polarized light incident on a total reflecting surface is in general changed to elliptically polarized light when it is reflected.

The ability of the reflecting element of the present invention to alter or modify phase shifts is therefore invaluable for varying the phase shift introduced into plane polarized light when the same is totally reflected in order to cause such light to become circularly polarized or to be made elliptically polarized to a desired degree. Conversely, the reflecting element of the present invention can operate upon elliptically or circularly polarized light so as to change the state of the polarization as desired upon its reflection.

In a modified embodiment of the element of the present invention, a variable phase shift can be created by forming the interference film so that the thickness thereof will vary over the reflecting surface.

Where the film is deposited on only a portion of the total reflecting surface, the element can be used as a Zernike phase plate for phase contrast microscopy. The thickness of the film in this application of the present invention is such as to provide a 90° retardation or acceleration to the zero order of the Abbe diffraction pattern as required in the theory of the phase contrast method.

Other objects and advantages of the present invention will appear from the following description taken in connection with the accompanying drawings in which:

Fig. 4 is a phase shift vector diagram showing the phase shift caused by a particular film-glass combination.

Fig. 7 is a schematic view showing a modification of the form of the invention illustrated in Fig. 6.

Fig. 8 is a schematic view of an embodiment of the invention which employs a rhomb.

Fig. 9 is a schematic view showing a modified form of the element of the present invention.

Fig. 10 is a schematic view of a microscope in which a still further modified form of the element is used.

Fig. 11 is a schematic view of an element which can be substituted for the element of Fig. 10.

Figure 1:
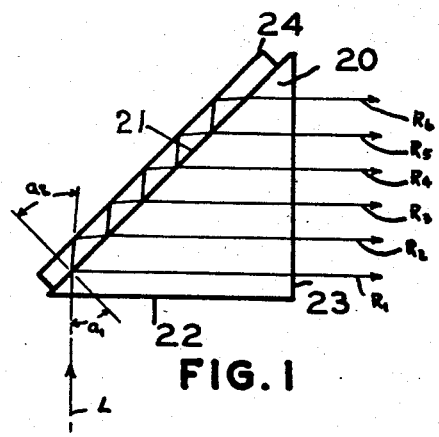
Fig. 1 is a schematic view of a right angle prism which embodies my invention and shows the path of a light ray traced through the prism.

One now preferred embodiment of the element of the present invention is shown by Fig. 1 wherein the reference character 20 represents a simple right angle prism which is formed of glass or other transparent substance of index $n_G$. Prism 20, as shown, has a hypotenuse surface 21 which makes an angle of 45° with the side faces 22 and 23. A thin interference film 24 of any suitable transparent material of index $n_F$ and substantially uniform geometrical thickness $d$, of the order of a wavelength of light, is carried by the hypotenuse 21. The prism 20 with its film are assumed to be in air. Fig. 1 traces a ray of light L through the prism 20, the ray L being perpendicular to the face 22, shown as the entrance face, and as having an angle of incidence with the hypotenuse surface 21 of $a_1$ and an angle of refraction in the film 24 of $a_2$.

When ray L strikes the hypotenuse surface 21, a portion of the ray is reflected and another portion is transmitted through the prism-film interface into the film 24 since the total reflecting properties of the prism have been shifted from the hypotenuse face to the film-air surface. The reflected portion of the ray is emitted through the exit face 23 and is shown as ray component $R_1$. On the other hand, the transmitted portion of the ray L proceeds through the film 24 to the film-air surface where it is totally reflected in a direction substantially parallel to the ray component $R_1$.

At the prism-film surface this just-mentioned totally reflected portion of the ray L is partially reflected and partially transmitted. The transmitted portion of the latter forms the ray component $R_2$ which is substantially parallel to $R_1$. At the second reflection at the prism-film surface, the part of the ray so reflected is directed back into the film 24. This process proceeds ad infinitum until substantially all of the light energy of the ray L is transmitted out of the prism.

The series of multiple reflections gives rise to a series of components of the ray L, those occurring after the ray component $R_2$ being indicated by ray components $R_3$ through $R_6$. While, as noted, the multiple reflections proceed ad infinitum and hence result in an infinite number of ray components, it should be kept in mind that Fig. 1 is for the purpose of diagrammatically illustrating the general effect of the prism and the interference film on light and that only by grossly exaggerating the thickness of the film 24 is it possible to indicate even a few reflections and resulting ray components.

The prism 20 and its film 24 will cause both unpolarized and polarized light to be redirected in a manner like that just described. However, as heretofore noted, a shift in the phase of polarized light accompanies its reflection. In the present invention, the resultant phase shift for a ray of polarized light will be the vector summation of the phase shifts of its individual reflected components which can be vectorially represented by the components $v_1$, $v_2$ and so on. The total phase shift for ray L depends on the reflection of light at the prism-film surface, as well as on the total reflection at the film-air surface and the geometrical thickness of the film. This makes it possible to selectively alter the phase shift which ordinarily occurs in reflected polarized light by suitably controlling the thickness and index of refraction of the interference film which is formed on a totally reflecting surface.

In explanation of the theory underlying the alteration of phase shift for total reflection by means of a thin film, it is to be noted that the amplitude reflectance $r$ of a thin film may be expressed in the imaginary form in the following manner, as is customary when ordinary Fresnel reflection as distinguished from total reflection occurs at each face of the film.

$$r = \frac{a + be^{-i\alpha}}{1 + abe^{-i\alpha}} \qquad (1)$$

where $a$ is the Fresnel amplitude reflectance of one surface of the film;

$b$ is the Fresnel amplitude reflectance of the second surface of the film;

$e$ is the base of the Naperian logarithms;

$i$ is, as usual, the $\sqrt{-1}$; and $\alpha$, the relative phase displacement between any two successive ray components, $R_1$ and $R_2$, $R_2$ and $R_3$, etc., which is introduced solely by the geometrical thickness of the film, and which may be given by the following equation:

$$\alpha = \frac{2\pi}{\lambda} 2 n_F d \cos a_2 \qquad (2)$$

Where $d$ is the geometrical thickness of the film;
$a_2$ is the angle of refraction in the film;
$\lambda$ is the wavelength in vacuum; and
$n_F$ is the refractive index of the film.

In connection with the sign of $\alpha$ in the foregoing, it is pointed out that a finite film thickness introduces a retardation between successive reflected ray components and hence in Equation 1, $\alpha$ appears, by convention, with a minus sign.

Contained in the expression for $r$ in Equation 1 are both the resultant amplitude of reflectance and its resultant phase angle. The latter, herein called $u$, is the vector summation of the individual phase displacements expressed in terms of angular measure. It is necessary to obtain the tangent of $u$ and this may be determined through the use of a well understood mathematical process which involves building the quotient of the imaginary part of Equation 1 with its real part. This procedures gives rise to the following equation:

$$\tan u = \frac{\text{imaginary}}{\text{real}} = \frac{(1-a^2) \, b \sin(-\alpha)}{a(1+b^2)+b(1+a^2)\cos(-\alpha)} \quad (3)$$

The above equations (1) and (3) are well known expressions of general character for a thin film. In applying them to the case of an interference film on a totally reflecting surface, it is necessary to develop these equations into forms where the phase shift caused by total reflection at the film-air surface is an explicit factor in them. A ray incident on the hypotenuse face 21 of prism 20, for example, first suffers an ordinary Fresnel reflection at the prism-film interface and therefore the symbol $a$ in Equation 1 can be left unaltered. However, the portion of this ray which reaches the second surface of the film is totally reflected and the amplitude reflectance of this portion at the second surface may be written as follows:

$$be^{i\beta} = e^{i\beta} \quad (4)$$

Where $b$ is the amplitude reflectance at the film-air surface and will equal unity where the reflection is total; and $\beta$ is the phase displacement introduced into each of the individual ray components $R_2$, $R_3$ and so on by total reflection at the film-air surface for light incident on that surface at an angle $a_2$, it being observed that no phase shift due to total reflection is added to the ray component $R_1$ which originates at the prism-film surface.

When Equation 4 is incorporated into Equation 1 so as to obtain the factor $\beta$ in the latter, it may be shown that the amplitude reflectance for a film on a totally reflecting surface assumes the value noted below.

$$r = \frac{a + e^i(-\alpha+\beta)}{1+ae^i(-\alpha+\beta)} \quad (5)$$

Similarly, where the factor $\beta$ appearing in Equation 4 is introduced into Equation 3, the latter takes on the following form:

$$\tan u = \frac{(1-a^2)\sin(-\alpha+\beta)}{2a+(1+a^2)\cos(-\alpha+\beta)} \quad (6)$$

The incident or reflected polarized light may be resolved into a component which is vibrating in a plane perpendicular to the plane of incidence, herein called the $s$ component, and into a component which is vibrating in a plane parallel to the plane of incidence, herein called the $p$ component. The phase angle $u$ will be different for the $s$ and $p$ components since both the prism-film amplitude reflectance $a$ and the phase shift $\beta$, the latter being due to total reflection, are different in the two preferred directions. Reflectances $a_s$ and $a_p$ for the $s$ and $p$ components may be obtained from the following Fresnel formulae:

$$a_s = \frac{\sin(a_2-a_1)}{\sin(a_2+a_1)} \quad (7)$$

$$a_p = \frac{\tan(a_2-a_1)}{\tan(a_2+a_1)} \quad (8)$$

Where $a_1$ and $a_2$ are, as previously noted, the angles of incidence and refraction, respectively.

The algebraic signs of $a_s$ and $a_p$ are important. For example, in reflection at a denser medium there is a phase displacement in the $s$ component of 180° for all angles of incidence and Equation 7 furnishes a minus sign to express this. For the $p$ component, there is also a 180° phase shift up to the Brewster angle. Under customary practice, however, the $p$ component is given a plus sign in this range because the coordinate system is so chosen that a plus sign denotes a phase shift. This convention cannot be employed in the foregoing calculations and the minus sign must be explicit where a phase shift of 180° is involved. As it is written, Equation 8 for the $p$ component furnishes the correct sign automatically on both sides of the Brewster angle.

Equation 6 requires a valuation of $\beta$, the phase shift resulting from total reflection at the film-air surface at an angle $a_2$. This valuation may be acquired by a calculation of the phase shift for the $s$ and $p$ components by the use of the following equations which are based on those, for example, set forth by Lord Kelvin in his Baltimore Lectures.

$$\tan \frac{\beta_s}{2} = +\frac{\sqrt{n_F^2 \sin^2 a_2 - 1}}{n_F \cos a_2} \quad (9)$$

$$\tan \frac{\beta_p}{2} = -\frac{\cos a^2}{n_F \sqrt{n_F^2 \sin^2 a_2 - 1}} \quad (10)$$

As indicated by the signs in Equations 9 and 10, the $s$ component is advanced in phase while the $p$ component is retarded, a fact in connection with polarized light which was first pointed out by Kelvin.

The phase shift occurring in polarized light, when reflected by an optical element having a totally reflecting surface on which there is an interference film, may be calculated from Equation 6 for given refractive index combinations of the optical element and the film. In conducting these calculations, Equations 7 and 8 are first used to find the Fresnel amplitude reflectances $a_s$ and $a_p$ for a desired angle of incidence $a_1$. The phase angles $\beta_s$ and $\beta_p$ are then calculated from Equations 9 and 10.

In practice, Equation 6 is solved separately for the $s$ and $p$ components by keeping $a$ and $\beta$ of that equation constant while varying $\alpha$, the film thickness in terms of angular measure, to obtain $\tan u_s$ and $u_p$, each as a function of the film thickness. Knowing $\tan u_s$ and $u_p$, the angles they represent are readily determined and it is merely a question of adding $u_s$ to $u_p$ to obtain the relative phase shift produced by the given combination.

Since the phase shifts $u$ are obtained as tangents, there is an ambiguity as to whether an angle will fall in the I or III quadrant if the sign is positive or in the II or IV quadrant if the sign is negative. However, where $u$ is computed for the complete range of $\alpha$ from 0° through 360°, the correct quadrant will become apparent from the continuity of the curve.

With the film thickness equal to zero, i. e. with $\alpha=0$, Equation 6 should give a value for $\tan u$ identical with that obtained in Equations 9 and 10 for no film. That such is the case will be apparent when $n_G$ instead of $n_F$ and $a_1$ instead of $a_2$ are used in the latter equations. It is to be observed that the phase shift goes through a complete cycle in the thickness range given by $\alpha=0°$ to $\alpha=360°$.

Figure 2:
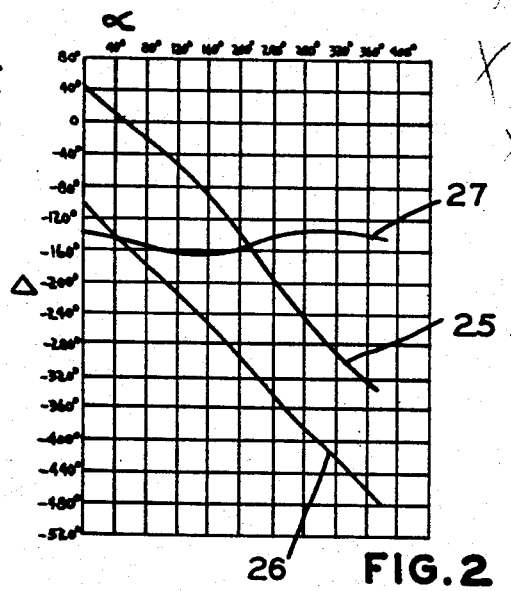
Fig. 2 illustrates graphically the effect on polarized light of a thin film placed on a totally reflecting surface, this being shown by curves of absolute and relative phase displacement for a specific film-glass combination.

Fig. 2 graphically plots film thickness $a$ against phase angle $u$ for the absolute phase displacements $u_s$ and $u_p$ and the relative phase displacement $\Delta$ or $u_s$ minus $u_p$ for a particular case in order to illustrate the phase changes which the $s$ and $p$ components undergo. Curves 25 and 26 of Fig. 2 are respectively for the $u_s$ and $u_p$ components while curve 27 gives the values for $\Delta$. The curves are plotted for the case of a transparent medium of index 1.52 on which there is a film of index 1.34, the angle of incidence $a_1$ being equal to 45°. The film thickness parameter $a$ is shown as varying from zero to 360°. For the conditions regarding index and angle of incidence just set forth, curves of the character shown in Fig. 2 give phase shifts at each filmed totally reflecting surface of any type of optical element including of course the right angle prism 20 of Fig. 1 as well as the other forms of optical elements hereinafter described.

In general of more importance than the phase angles $u_s$ and $u_p$ taken separately is their difference $\Delta$. It is this difference which determines the elliptic defect when a totally reflecting surface is used in a system with polarized light. As shown by curve 27 in Fig. 2, $\Delta$ increases in the negative direction from a value of 140° at zero film thickness to a maximum value of 164°, decreases to a minimum of 134° and rises again to reach the zero thickness value of 140° at the completion of the cycle or at a value of $a$ equal to 360°.

Figure 3:
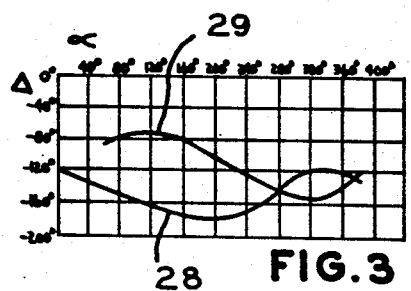
Fig. 3 is a view similar to Fig. 2 but graphically shows curves of relative phase displacement for two different film-glass combinations.

Fig. 3 shows relative phase displacement or $\Delta$ curves for two other examples. These curves compare the difference in effect when employing a film which has a lower refractive index and one having a higher index than the index of the optical element on which each film is deposited. Curve 28 gives the relative phase displacement $\Delta$ for an optical element of refractive index 1.72 with a film of index 1.34 while curve 29 is for an optical element having a refractive index of 1.52 with film index of 2.30. In both curves the angle of incidence $a_1$ is equal to 45°. The curves 28 and 29 will indicate the effect on polarized light caused by right angle prisms which are similar in outline to that shown in Fig. 1. Of noteworthy interest is the opposite trend of the curves 28 and 29 for like film thicknesses.

The foregoing will indicate the possibilities of altering the phase shift so as to obtain desired polarization in reflected light. With specific reference to the two extreme cases in the three examples set forth in Figs. 2 and 3, it will be evident that by varying the film thickness it is possible to alter the value of the phase shift which occurs at an angle of incidence of 45° between the limits of 116° to 178° for the index combination which curve 28 represents and between the limits of 72° and 154° for the index combination of curve 29. Greater divergence of the indices of the film and of the substance on which the film is provided will widen these limits.

The alteration in phase shift originates in the interference of the ray components broken off from the parent incident ray L by reflection at the two surfaces of the film, as best illustrated in Fig. 1. Since the ray components $R_1$, $R_2$, etc., all arise from the parent incident ray L, they are coherent and their phase displacements will add vectorially. The relative phases of the individual ray components, as heretofore mentioned, will be altered both by reflection at the film surfaces and also by the retardation due to the thickness of the film.

Fig. 4 shows this vector addition carried out diagrammatically to scale and the phase resultant given for a film of index 1.72 which is formed on material of index 1.34 to a thickness $a$ of 210°, the angle of incidence for the parent ray L being 45°. In Fig. 4, the $s$ and $p$ values for the total phase shift suffered by each of the first few multiple reflected ray components are disclosed. For example, $s$ and $p$ values for the ray component $R_1$ are represented, respectively, by the vectors $v_{1s}$ and $v_{1p}$, for the ray component $R_2$ by the vectors $v_{2s}$ and $v_{2p}$ and so on for the remaining ray components which are disclosed. Lines $v_s$ and $v_p$ represent, respectively, the resultants of the $s$ and $p$ vectors and connect the point of origin of the vector diagram to the $s$ and $p$ vectors for the last ray component to be reflected.

It will be noted that the angle between the two strongest vectors, namely, $v_{2s}$ and $v_{2p}$ for the ray component $R_2$ which is reflected directly from the totally reflecting surface of the film, is independent of the thickness of the film. As the film thickness varies, vectors $v_{2s}$ and $v_{2p}$ rotate in fixed relation to each other. It is the addition to them of the remaining vectors which alters the phase angle. For this reason, vectors $v_{2s}$ and $v_{2p}$ are drawn first in the vector diagram, although so far as the values of the resultants are concerned, the vectors could have been laid out in any desired sequence.

Moreover, each pair of $s$ and $p$ vectors which succeed the vectors $v_{2s}$ and $v_{2p}$ will also rotate in fixed relation to each other as the film thickness changes. However, the rate of rotation is different for each of the succeeding pair of vectors. Consequently, there will be large variations in the phase displacements between the $s$ and $p$ resultants as will be apparent from the positions of the vector $v_s$ and $v_p$. From three to six of the first succeeding ray components must usually be taken into account to obtain an accurate answer by these graphical methods. In the latter connection, it may be necessary to plot more of the $s$ values than the $p$ values in preparing the vector diagram as the $s$ values are more copiously reflected at the film-prism surface than are the $p$ values and by the same token $u_s$ is more affected by the film than $u_p$.

Figure 5:
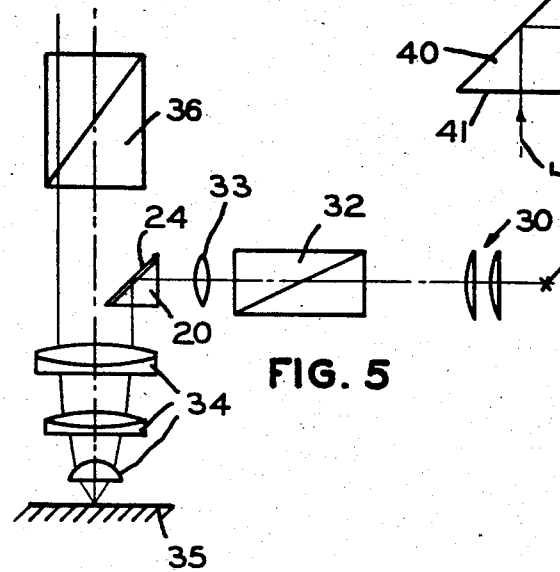
Fig. 5 is a schematic view of a vertical illuminator system which employs a right angle prism like that of Fig. 1.

To more fully illustrate one useful application of the theory heretofore set forth, I have shown in Fig. 5 the filmed right angle prism 20 of Fig. 1 embodied in a simple type of vertical illuminator system employed with a microscope. The system shown in Fig. 5 is particularly adaptable for the examination of opaque anisotropic specimens in polarized light and comprises condenser lenses 30 which direct light from a source 31 through a polarizer 32. Plane polarized light emerging from polarizer 32 is directed by lens 33 into the prism 20 which is shown with an interference film 24 on its hypotenuse. Prism 20 totally reflects the light downwardly through one side of the objective lenses 34 onto the specimen 35. Light reflected from the specimen ascends through the other side of the objective lenses 34 to analyzer 36, from which latter, analyzed light is passed to the eyepiece of the microscope.

If a right angle prism without a reflectance film on its hypotenuse is employed in a system like that of Fig. 5, it may be demonstrated that the phase displacement $\Delta$, between the $s$ and $p$ components of plane polarized light which is totally reflected by the prism, will equal 139° 45′ for a prism having an index of 1.52. When a right angle prism without an interference film is used in the semi-aperture type of system of Fig. 5, it is necessary to orient the polarizer 32 with extreme precision with regard to the prism so that the vibration direction of the polarizer is parallel or perpendicular to a principal section of the prism. Otherwise, the ellipticity introduced by total reflection would not allow the analyzer to give extinction. Even if the polarizer be oriented in this way, oblique rays will become elliptically polarized and only the center of the field can approach good extinction.

If the phase shift $\Delta$ can be made 0° or 180° or 360° etc., the elliptic defect will be substantially eliminated when plane polarized light is reflected. In the case of effecting a phase shift of 180° by the employment of a reflectance film, the totally reflecting surface acts as a half wave plate rotating the direction of polarization but not creating ellipticity. As the curves of Figs. 2 and 3 show, the phase shift $\Delta$ of a right angle prism of index 1.52 can be varied within the range of 70° to 155° with a film of index 2.3 and within a range of 130° to 165° with a film of index 1.34. None of the usable values of $\Delta$, namely 0°, 180° or 360°, fall within the just-noted ranges. However, a desired value for $\Delta$ of 180° may be reached by changing the glass or other material of the prism to that of a higher index.

For example, curve 28 of Fig. 3 shows that a $\Delta$ of nearly 178° may be obtained when using a film of index 1.34 with $\alpha$ of 210° on a prism of index 1.72. This indicates that a prism of still higher index is needed when using a film of index 1.34 and suggests the use of a prism formed of extra dense flint of index 1.75 to give the desired $\Delta$ of 180°. The foregoing examples, illustrating the effect of film thickness and index, bring out an important aspect of the invention. This resides in the ability of the practices herein described to provide a predetermined phase shift in a given index combination by the suitable selection of film thickness.

In a system employing a right angle prism, such as the prism 20, the use of a phase shift of 180° as compared to 0° or 360° will reverse the directional sense of rotation given an analyzer, located behind the right angle prism, in following a given rotation of the polarizer. A clockwise rotation of the polarizer, as seen by looking towards the light source, can be followed by rotation of the analyzer in the same directional sense. The azimuthal rotation sense of the vibration from the analyzer is reversed by the act of reflection and also by the half wave or 180° phase shift. In the case of the vertical illuminator system shown in Fig. 5, the reflection at the surface of the specimen 35 again reverses the azimuthal rotation sense so that the tube analyzer 36, or a cap analyzer if used, would have to be rotated counterclockwise to follow a clockwise rotation of the polarizer 32.

Figure 6:
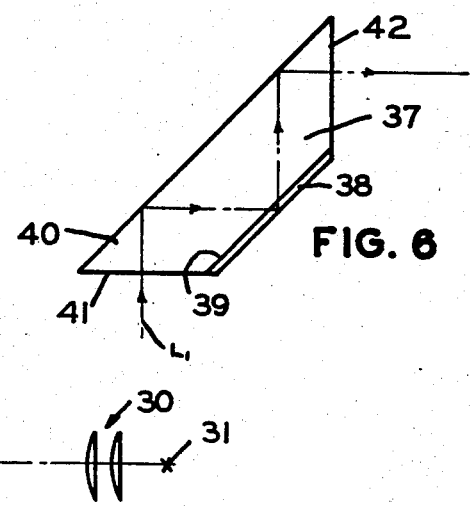
Fig. 6 is a schematic view which shows my invention embodied in a special type of deviating prism.

Use of my invention is not limited solely to a right angle prism. For example, it may be applied to a 90° deviating prism formed of a right angle prism and a rhomb cut from the same piece of glass or other transparent material. A prism 37 of this character is shown in Fig. 6 and it may be formed of materials which vary widely in index. The prism 37 of Fig. 6 is shown with a thin film 38 on its reflecting face 39. The other totally reflecting face 40 is left unfilmed.

Fig. 6 schematically traces a ray $L_1$ through the prism 37, the multiple reflections at the film 38 being omitted from the drawings for the purpose of clarity. Ray $L_1$ is shown as travelling in the direction of the arrows and as incident to surface 40 at 45°. The end or entrance and exit surfaces 41 and 42, respectively, of prism 37 are inclined at 45° to the totally reflecting surfaces 40 and 39.

The phase shift normally introduced into polarized light by material of index 1.52 when the light is incident to a totally reflecting surface at 45° equals 139° 45′ as already noted. Assuming prism 37 to have a refractive index of 1.52, the two reflections at the totally reflecting and unfilmed surface 40 will cause phase shifts $\Delta_1$ and $\Delta_3$, each equal to 139° 45′, to be introduced into polarized light which is traversing the prism. The full phase shift thus caused by reflection at the surface 40 will thus equal the sum of $\Delta_1$ and $\Delta_3$ or 279° 30′.

A phase shift also takes place at the totally reflecting surface 39, its value also equaling 139° 45′ when 39 is unfilmed. However, if the total phase shift desired is 360°, it will be apparent that the totally reflecting surface 39 should provide a shift $\Delta_2$ of only 80° 30′ so that $\Delta_1$, $\Delta_2$ and $\Delta_3$ will add to the sum of 360°. Referring now to Fig. 3, it may be noted that the desired value of 80° 30′ for $\Delta_2$ may be obtained by providing a film 38 of index 2.3 on the totally reflecting surface 39 to a thickness $\alpha$ of 75° or $\alpha$ of 160° when the prism 37 has an index of 1.52. Obviously, other index combinations for the film 38 and prism 37 fall within the scope of the invention.

The form of the invention shown in Fig. 6 suggests the possibility of filming both reflecting surfaces of the prism. Such practice is carried out in Fig. 7 which shows a prism 43 of a construction and design which is substantially similar to prism 37. The totally reflecting surfaces of the prism 43 are denoted by 44 and 45 and its entrance and exit surfaces by 46 and 47. If a phase shift of 360° is to be obtained, it would be desirable to have a phase shift of 120° at each of the three total reflections of a ray $L_2$ shown at an angle of incidence of 45°. $\Delta_1$, $\Delta_2$ and $\Delta_3$ may, in this instance, be each given a value of 120° by placing a suitable film 48 on each totally reflecting surface 44 and 45. For a prism of index 1.52, a film 48 having an index of 2.3 and a thickness $\alpha$ of 20° or 240° will provide the desired shift of 120° at each reflection, reference being again had to the curve 29 of Fig. 3. The invention also comprehends the use of other index combinations for the film 48 and the prism 43, the foregoing merely being set forth as one illustrative example to indicate the scope of the invention.

In the forms of the invention shown in Figs. 6 and 7, the values of $\Delta$ which are used, occur at values of $\alpha$ where the curve 29 of Fig. 3 is ascending or descending. Accordingdy, a small change in $\alpha$ will change the individual $\Delta$'s and will destroy the condition that the overall phase shift be exactly 360°. It is to be noted that $\alpha$ varies for a given geometrical film thickness, not only with the angle of incidence on the film but also with the wavelength. Preferred practice hence selects a prism-film combination having the value of the desired phase shift $\Delta$ as a maximum or minimum in the curve of $\Delta$ plotted against $\alpha$.

Thus in the prism 43 of Fig. 7 it is preferable to employ a film of an index such that the high or the low points of the $\Delta$ and $\alpha$ curve will fall at a thickness $\alpha$ corresponding to a $\Delta$ of 120°. Where the curve of $\Delta$ plotted against $\alpha$ fulfills this condition, that is to say, when $$\frac{d\Delta}{d\alpha}$$

equals zero, there will be but slight variation of $\Delta$ with a change of $\alpha$ caused by change in wavelength or in angle of incidence. Film material of index 2.0 instead of 2.3 is suggested for depressing the $\Delta$ and $\alpha$ curve sufficiently to satisfy this condition for the 120° phase shift needed in the prism 43. When the ordinary right angle prism 20 of Figs. 1 and 5 has an index of about 1.75 and a film of index 1.34 is used to obtain a phase shift of 180°, the condition that $$\frac{d\Delta}{d\alpha}$$

equal zero is perforce satisfied since a phase shift of 180° will just barely be reached by this combination.

While the combination described provides a phase shift of 120° at each totally reflecting surface of the prism of Fig. 7 so as to cause incident plane polarized light to be emitted as plane polarized light from the prism, such practice need not necessarily be followed. The value of the phase shift at each total reflection is immaterial so long as the sum of all of the phase shifts caused by the prism of Fig. 7 adds to 360° if plane polarized light is to emerge therefrom. It will hence be realized that my invention comprehends the use, on different totally reflecting surfaces, of films of different indices and/or thicknesses as well as films of like index and of the same or different thickness in obtaining a phase shift of any desired value, including a phase shift of 360°.

While I am aware that the art has employed a 90° deviating prism of a geometrical shape substantially similar to the prisms of Figs. 6 and 7 for the purpose of eliminating ellipticity, the prior art effort, as exemplified by U. S. Patent No. 2,128,394, has depended entirely on the formation of the prism of glass of special refractive index to obtain this effect, namely, an index equal to the $\sqrt{3}$. My invention is distinguishable therefrom on the basis that I employ a prism of substantially any index as well as in the use of an interference film with such a prism. It should also be noted that alteration of phase shift is not limited in my invention to a single value at any totally reflecting surface but that the alteration may be selected, whereas the phase shift at each totally reflecting surface of the just-mentioned prior art prism must always be limited to 120°. Furthermore, since one is not limited to a glass of definite index, a glass which is resistant to weathering or staining can be used, so that the phase shift produced is permanent and is not altered by the spontaneous formation of a stain film over long periods of time.

Fig. 8 illustrates the invention in use with another type of 90° prism, namely, the rhomb 49 having the parallel totally reflecting surfaces 50 and 51 which are joined by the parallel end faces 52 and 53, the latter being at an angle of 45° to the two totally reflecting surfaces. A reflectance film 54 is formed on both of the reflecting surfaces 50 and 51. Passage of a ray $L_3$, incident on film 54 at 45°, is traced through the prism 49.

As heretofore pointed out, glass of index 1.52 will introduce a phase shift of 139° 45′ in polarized light which is totally reflected in such medium and is at an angle of incidence of 45°. Thus, if the rhomb 49 were unfilmed and were constructed of glass of index 1.52, there would be a total phase shift of 2 × 139° 45′ or 279° 30′ in polarized light passing through the prism due to the total reflection at the two air-glass surfaces. This phase shift will, of course, be altered by the use of the film 54 on the surfaces 50 and 51.

In the case of overcoming the elliptic defect in plane polarized light, the films 54 should be of such character as to cause $\Delta_1$ and $\Delta_2$ to be each equal to 90° thus causing a total phase shift of 180°. A suitable combination for this purpose is provided by a film of index 2.3 at a thickness $\alpha$ of 60° as will be apparent from a study of the curve 29 of Fig. 3. However, the preferred condition that $$\frac{d\Delta}{d\alpha}$$

equal zero would not be satisfied with this film index and it would, in general, be advantageous to select a film material of lower index.

As previously mentioned, my invention comprehends alteration of the phase shift to produce circularly polarized light. This can be effected with plane polarized light by the use of the right angle prism 20 of Fig. 1 filmed on its hypotenuse 21 to give a value for $\Delta$ of 90°. A film-glass combination like that described in connection with the rhomb of Fig. 8 could be employed for this purpose, the same reservation as to the value of $$\frac{d\Delta}{d\alpha}$$

not equaling zero for this combination being here noted. Useful application of a circularly polarizing prism of this nature can be expected in connection with a polariscope as well as in other instruments.

A variable phase shift can be introduced into a beam of polarized light, referring now to Fig. 9, by forming the interference film 55 of variable thickness on the total reflecting surface 56 of the prism 57. For example, if a ray such as ray $L_4$ be directed so as to be incident on the surface 56 in an infinite number of cases as by moving the stop 58 from the position shown in full lines to the position shown in broken lines, a continuously varying phase shift will be created in the ray $L_4$.

An element such as illustrated in Fig. 9 can be used to compensate and measure an unknown retardation in a sample introduced in the ray.

I have found that one embodiment of the element of the present invention can be used as a Zernike phase plate for phase contrast microscopy.

In this embodiment of the present invention, referring now to Fig. 10, an interference film 60 is deposited on the reflecting face 61 of the prism 62. The film 60 is formed on but a portion of the surface 61 and the film should be of such a size and area as to cover in projection the zero order Abbe diffraction pattern in the back focal plane of the objective of the microscope and should be of such a thickness as to provide a 90° retardation or acceleration to the zero order as required in the theory of the phase contrast method.

Since the retardation of the film with respect to the unfilmed remainder of the totally reflecting surface 61 will be different for light vibrating in the $p$ and $s$ directions, polarized light would probably be preferable for illumination. For a film index of 1.34 on a right angle prism of index 1.52, Fig. 2 shows that the film thickness should be that corresponding to $\alpha$ of 85° for the $p$ direction and $\alpha$ of a value of 120° for the $s$ direction. If the film thickness is one or the other of these two values, a variation in retardation between these limits would be obtained by rotating the polarizer from one position to the other.

The prism 62 would be inserted in the optical system of the microscope as schematically shown in Fig. 10, in which the ocular and objective systems are indicated at 63 and 64, respectively, and the specimen at 65. In this use of the element of the present invention, the prism 62 would replace the conventional Zernike phase plate which is positioned in the back focal plane of the microscope objective.

It will be obvious that an element such as shown in Fig. 11 could be used in place of the element 62 shown in Fig. 10. This element of Fig. 11 comprises a prism 66, the reflecting surface 67 of which carries, except on a predetermined portion thereof, an interference film 68. In the element 66 the unfilmed portion of the reflecting surface 67 for the correct indices of the prism and film give a variation in phase acceleration between certain limits by rotating the polarizer from one position to the other as in the case of the element 62.

While the foregoing illustrations have all employed an angle of incidence of 45°, my invention may be carried into practical effect at other angles of incidence. Total reflection at angles other than 45° is often met in practice, for example, in roof prisms, where, as in military and other observation instruments, atmospheric polarization must be considered. The effect of phase shift caused in a roof prism or a Porro system is to prevent the full effective use of an ocular analyzer associated with such instruments. Thus, the use of films for angles of incidence other than 45° forms an important aspect of my invention.

Besides the single films illustrated in the drawings, my invention comprehends the use of multiple films, that is to say, superposed films of different indices. In connection with multiple films, it may be pointed out that large effects are to be expected from their use because of the large values of the vector components to which they give rise.

As a special case, my invention includes within its scope the beneficial effects on phase shift derived in instances where degenerate total reflection takes place due to the use of a film of an index which is lower than the index of the optical element or prism upon which it is placed.

Examples of the invention have been described in regard to the reflection of plane polarized light. Obviously, the phase of elliptically or circularly polarized light may be altered by the use of a suitable index combination of the film and the optical element used for total reflection. Thus, under suitable conditions, it is possible to alter elliptically polarized light so that on reflection it is rendered plane or circularly polarized or is elliptically polarized to a desired degree. Similarly, circular polarized light may on reflection be rendered plane or elliptically polarized.

Reflectance or interference films employed throughout my invention are of well known types and their formation is well understood by the art. Under one practice, a film suitable for use on a totally reflecting surface may be formed by depositing a metallic salt or oxide on such surface by a high vacuum process. While any suitable transparent substance may be used to form an evaporated film, substances which are non-absorbing as to light, tin oxide and zinc sulphide to name two examples, are preferable but not essential.

Where the optical element to be filmed is of glass, the reflectance film may be provided by leaching out acid soluble glass forming oxides to leave a layer which is rich in silica on the totally reflecting surface of the optical element.

Films may be formed in many other ways and by the use of many other materials so long as the films fulfill the requirements as to refractive index and thickness previously mentioned. For example, a film in the form of a thin layer of glass, which answers these requisites, falls within the scope of my invention. Also contemplated are films formed by the well known process of spraying such substances as titanium tetrachloride, silicon tetrachloride and the like on glass or other transparent material.

Therefore, while certain preferred embodiments of the invention have been illustrated and described herein, it is to be understood that the invention is not limited thereby but is susceptible of changes in form and detail within the spirit of the invention and the scope of the appended claims.

I claim:

1. A transparent body having a plurality of totally reflecting surfaces from which light entering the body is successively reflected, each of said surfaces being characterized by introducing a shift in the phase of the components of polarized light which is passing through the body and which is reflected by said surfaces; and means on one of said surfaces for selectively modifying the phase shift between the components normally introduced in polarized light by reflection at that surface whereby to selectively alter the sum of the phase shifts occurring at all of the surfaces, said means comprising a nonmetallic interference film, said film being transparent and substantially isotropic and having an index of refraction different from that of said body and a substantially uniform geometrical thickness which is of the order of magnitude of a wavelength of light, the refractive index and thickness of the film being chosen to produce the selected phase displacement of the polarized light reflected by said surfaces.

2. An optical element formed of transparent material and having a surface positioned in a path of polarized light rays for totally reflecting the polarized light rays, means for selectively altering the phase displacement between the components which polarized light normally undergoes when it is totally reflected at said surface, said means comprising a thin homogeneous, nonmetallic transparent film on said surface, said film having a refractive index which is different from that of the element, said film being substantially isotropic and having a substantially uniform thickness, the refractive index and thickness of the film being chosen so as to produce the selected phase alteration in the polarized light reflected by said surface.

3. An optical element of transparent material having a surface at which total internal reflection takes place for use in an optical system employing polarized light of a known wave length and which is incident on said surface at a predetermined angle; and means on said surface for selectively controlling the phase displacement between the components of polarized light which is normally introduced when polarized light is totally reflected by said surface, said means comprising a relatively thin non-metallic interference film covering said surface, said film being substantially isotropic and having an index of refraction less than that of said element, the effective optical thickness of said film being less than a wave length of said light and varying from a maximum thickness at one side of said surface to a minimum thickness at the opposite side of said surface.

4. An optical element for reflecting polarized light comprising a body of transparent material having a surface positioned in a path of polarized light rays for totally reflecting said rays, means on the surface for selectively altering the phase displacement between the components of polarized light which normally occurs when polarized light is totally reflected, said means comprising a thin, homogeneous, non-metallic, transparent film, which is substantially isotropic and has a refractive index different from that of said body, said film having a geometrical thickness which is of the order of magnitude of a wave length of light, the refractive index and thickness of the film being chosen to produce the selected phase displacement of the components of the polarized light reflected by the surface.

ARTHUR F. TURNER.